(12) United States Patent
Irmler et al.

(10) Patent No.: US 8,794,300 B2
(45) Date of Patent: Aug. 5, 2014

(54) EXHAUST GAS COOLER FOR A MOTOR VEHICLE

(75) Inventors: Klaus Irmler, Tuebingen (DE); Bernd Kraemer, Oberriexingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 1051 days.

(21) Appl. No.: 12/776,767

(22) Filed: May 10, 2010

(65) Prior Publication Data
US 2010/0218914 A1 Sep. 2, 2010

Related U.S. Application Data

(63) Continuation of application No. PCT/EP2008/009559, filed on Nov. 12, 2008.

(30) Foreign Application Priority Data

Nov. 12, 2007 (DE) .......................... 10 2007 054 165

(51) Int. Cl.
*F28F 9/013* (2006.01)
*F28D 7/16* (2006.01)

(52) U.S. Cl.
USPC ................................ 165/67; 165/81; 165/140

(58) Field of Classification Search
USPC ............................................ 165/140, 67, 81
See application file for complete search history.

(56) References Cited

U.S. PATENT DOCUMENTS

| | | | |
|---|---|---|---|
| 2,264,820 A * | 12/1941 | Young ........................... 165/140 |
| 5,205,349 A | 4/1993 | Nagao et al. |
| 5,570,738 A * | 11/1996 | Christensen .................... 165/67 |
| 5,983,992 A * | 11/1999 | Child et al. ...................... 165/81 |
| 6,283,199 B1 * | 9/2001 | Nakamura et al. .............. 165/81 |
| 6,615,604 B2 * | 9/2003 | Neufang ........................ 165/140 |
| 7,000,415 B2 * | 2/2006 | Daddis et al. ................. 165/152 |
| 7,108,050 B2 | 9/2006 | Reichle et al. |
| 7,389,810 B2 | 6/2008 | Harada |
| 2004/0250988 A1 | 12/2004 | Mechanek |
| 2006/0081363 A1 * | 4/2006 | Chissus ......................... 165/173 |
| 2006/0213639 A1 * | 9/2006 | Kobayashi et al. ............. 165/67 |
| 2007/0144713 A1 * | 6/2007 | Sugimoto et al. ............. 165/140 |
| 2007/0163751 A1 | 7/2007 | Balei et al. |
| 2007/0204614 A1 | 9/2007 | Kolb |
| 2008/0047533 A1 | 2/2008 | Kardos |
| 2011/0056652 A1 | 3/2011 | Neher et al. |

FOREIGN PATENT DOCUMENTS

| | | |
|---|---|---|
| CN | 101061295 A | 10/2007 |
| DE | 103 22 211 A1 | 2/2004 |
| DE | 103 15 095 A1 | 10/2004 |
| DE | 10 2005 047 840 A1 | 6/2006 |
| EP | 1 845 242 A2 | 10/2007 |
| JP | 6-41091 U | 5/1994 |
| JP | 2004-044870 A | 2/2004 |

(Continued)

*Primary Examiner* — Leonard R Leo
(74) *Attorney, Agent, or Firm* — Muncy, Geissler, Olds & Lowe, P.C.

(57) ABSTRACT

An exhaust gas cooler for a motor vehicle is provided that includes a first collector box on an inlet side and a second collector box on an outlet side, and a plurality of exchanger tubes extending between the collector boxes for exhaust gas to flow through. Air can flow around the exchanger tubes so as to cool the exhaust gas. At least one supporting member is attached to at least one of the collector boxes, a force produced by the thermal expansion of the exchanger tubes being passed into the supporting member.

15 Claims, 5 Drawing Sheets

(56) References Cited

FOREIGN PATENT DOCUMENTS

| JP | 2005-522662 A | 7/2005 |
|---|---|---|
| JP | 2006-234199 A | 9/2006 |
| JP | 2007-163015 A | 6/2007 |
| JP | 2007-519883 A | 7/2007 |
| WO | WO 2006/054939 A1 | 5/2006 |
| WO | WO 2006/135335 A1 | 12/2006 |
| WO | WO 2007/082774 A2 | 7/2007 |
| WO | WO 2008/048174 A1 | 4/2008 |

* cited by examiner

EXHAUST GAS COOLER FOR A MOTOR VEHICLE

This nonprovisional application is a continuation of International Application No. PCT/EP2008/009559, which was filed on Nov. 12, 2008, and which claims priority to German Patent Application No. 10 2007 054 165.3, which was filed in Germany on Nov. 12, 2007, and which are both herein incorporated by reference.

BACKGROUND OF THE INVENTION

1. Field of the Invention

The invention relates to an exhaust gas cooler for a motor vehicle and an integrated unit of an exhaust gas cooler and charge air cooler.

2. Description of the Background Art

In internal combustion engines of motor vehicles, a known measure is to cool a portion of an exhaust gas flow and to return it to an intake tract.

DE 10 2005 047 840 A1, which is incorporated herein by reference, describes an air-cooled exhaust gas cooler according to the principle of a shell-and-tube heat exchanger, in which a stack of parallel flat tubes with ribs situated therebetween is situated between side collector boxes. The exhaust gas is supplied via one of the collector boxes and distributed to the plurality of exchanger tubes around which air flows for the purpose of cooling the exhaust gas.

SUMMARY OF THE INVENTION

It is therefore an object of the present invention to provide an exhaust gas cooler and an integrated unit of an exhaust gas cooler and a charge air cooler, which may be easily integrated into a motor vehicle under high thermal load produced by the hot exhaust gas and the cooling of the exhaust gas.

Because a supporting member absorbs the forces produced by thermal expansion, the operating reliability of the exhaust gas cooler is improved.

In the case of directly cooled or air-cooled exhaust gas coolers, in particular, enormous fluctuations in the temperature of the exchanger tubes may occur, which are associated with corresponding material expansions and resulting tensile, shearing or bending forces. At the same time, the material thickness, for example, of exchanger tubes or tube bases is minimized as much as possible to ensure low weight and good heat transfer and thus high performance.

In an embodiment of the invention, the supporting member can be designed as a holding member for connecting the exhaust gas cooler to a supporting structure, the holding member undergoing elastic deformation upon thermal expansion of the exchanger tubes. Expansion of the exhaust gas cooler as a whole is thus compensated via its holding means or attachment without the holding means introducing undesirably high forces into the exhaust gas cooler or charge air cooler, in particular forces that are locally directly against the expansion. Depending on the detail design, a portion of the vibrations introduced by the pulsating exhaust gas flow may be absorbed or dampened by an elastically deformable holding means of this type.

In an embodiment, the holding member includes a multi-angled, sheet metal molded part, in particular a largely Z-shaped sheet metal molded part. Due to the multi-angled design, which results, for example, in a zig-zag-shaped, S-shaped, meander-shaped, Z-shaped or similar cross-section, an elastic holding means may be produced which is very rigid in the vertical direction and is oriented in the direction of angularity, for example in the direction of the exchanger tubes. This is particularly advantageous if the active acceleration forces are strongest in the vertical direction.

The holding member can be integrally connected to the exhaust gas cooler, in particular by means of welding. Welding, can include high-temperature soldering (>900° C.) or brazing (450° C.-900° C.), for example using a solder layer which is applied to a metal sheet in the form of a paste in a soldering furnace. Due to the high exhaust gas temperatures, air-cooled exhaust gas coolers are usually made of steel or another highly heat-resistant material.

Depending on the specific arrangement, for example in connection with a precooler, the exhaust gas cooler according to the invention may also be made of aluminum or another less heat-resistant material. For easy assembly, the holding member may be screwed to the supporting structure, which makes it possible, in particular, to remove it for the purpose of maintaining or replacing the exhaust gas cooler. On the whole, a particularly advantageous combination is provided if the holding member is integrally mounted on the hot exhaust gas cooler and attached to the supporting structure by a screw connection or another corresponding detachable connection.

A first holding member can be situated on the first collector box and a second holding member can be situated on the second collector box, the one holding box being held in a largely stationary manner on the supporting structure and the other collector box moving relative to the supporting structure as a function of the thermal expansion. For example, this allows one connection having only a low position tolerance to be provided on the stationary collector box and the other connection, which has a greater position tolerance, may be provided on the collector box which moves in relation to the thermal expansion.

In an embodiment, it is provided that a first holding member is situated on the first collector box, and a second holding member is situated on the second collector box, the two holding members being attached to surfaces that are angled in relation to each other, in particular at right angles. This makes it possible to easily achieve a production-related component tolerance in multiple, in particular all, spatial directions, due to the positioning of the holding members on the surfaces.

In a further embodiment of the invention, which may be provided as an alternative or in addition to the first embodiment, the supporting member is designed as a side part for laterally covering the plurality of exchanger tubes. Lateral covering of air-circulated tube bundles are already common for reasons of operating reliability. A side part of this type can be therefore designed in a special manner as a supporting member for absorbing forces produced by expansion and mounted on the collector boxes so that a tension member is provided which acts in the longitudinal direction of the exchanger tubes. To ensure easy and cost-effective manufacturing, the side part is designed, in particular, as a one-piece, sheet metal molded part. As an alternative, however, it may also be designed, for example, as a molded part which is bonded from multiple sheet metal pieces.

In an embodiment, the side part has latching tabs at the ends for integral attachment to the collector box, the latching tabs extending along a length of the collector box. This makes it possible to achieve a particularly good reinforcement against a bending load of the outer side exchanger tubes against the collector boxes or the attachment of the exchanger tubes in the bases. Bending loads of this type regularly occur as a result of uneven temperature distribution and thus produce variable expansion of the different exchanger tubes. For example, more exhaust gas regularly flows through the middle exchanger tubes in an even arrangement of parallel tubes, so that these exchanger tubes are hotter than the outer side exchanger tubes. Furthermore, the front of the exchanger tubes, around which flows cooling air and which are designed, in particular as flat tubes, is cooler than the rear. This produces the aforementioned bending stresses, which are well compensated by the side part and its latching tabs. To provide a particularly effective support, it is provided that the length of the latching tabs is greater than one, in particular greater than two, repeating units of the exchanger tubes.

The side part may be easily provided with a folded edge largely along its entire length, in particular a U-shaped cross-sectional profile, which ensures good rigidity.

According to an alternative embodiment, the side part can be provided with a folded edge only in a partial area of its length, in particular a U-shaped cross-sectional profile.

According to an embodiment, the side part may be situated in such a way that the folded edge or one or both legs of the U-shaped cross-sectional profile partially or largely entirely covers the outermost layer of ribs. The impairment of the temperature control of the outermost tube layer associated with this may be accommodated, since the outermost tube layer already has a lower wall temperature than the tube layers in the middle of the heat exchanger, due to the lower gas mass flow. The temperature control impairment may counteract a temperature gradient from the middle of the heat exchanger to the outermost tube layer, so that thermal stresses are advantageously reduced.

The side part can be integrally connected over a wide area, in particular via a outer side rib of the exhaust gas cooler. The supporting force may be particularly effectively introduced thereby into a network of flat tubes and cooling ribs.

In an embodiment, the side part has at least one weak point in the direction of the exchanger tubes at a distance from its connection with the collector box. The weak point may be easily designed as a slot or opening in the side part. A weak point of this type makes it possible to reduce the support of the edge tubes in their middle area, while providing substantial support in the end areas of the tubes. Support is desired, in particular, in the end areas, in order to reduce the forces produced by expansion at the sensitive transitions or welds or solder joints between the exchanger tubes and the bases of the collector boxes.

In an another embodiment, cooling ribs, for example, made of steel, can be situated between the exchanger tubes. The cooling ribs can end at a distance of more than approximately 10 mm, in particular up to approximately 25 mm, from the base of the collector box, in order to reduce mechanical stresses produced by expansion. Moreover, the cooling ribs can have a material thickness of no more than approximately 0.15 mm, preferably 0.1 mm, in particular approximately 0.08 mm. As an alternative or in addition, it may be provided that the cooling ribs have rounded or angular edges to reduce their rigidity in the vertical direction.

The object of the invention is achieved for an aforementioned integrated unit of an exhaust gas cooler and an air charge cooler. A space-saving arrangement is provided by situating the exchanger tubes of the exhaust gas cooler on the same plane and next to the exchanger tubes of the charge air cooler without overlapping. The collector boxes of the charge air cooler have an area that is not penetrated by exchanger tubes of the charge air cooler in their longitudinal direction, the exhaust gas cooler being accommodated between the collector boxes of the charge air cooler in this area. The extended area of the collector boxes, which may also be designed or conceived of as a type of rigid supply line to the charge air cooler, simultaneously form a supporting structure holding the exhaust gas cooler in a suitable manner. An arrangement of this type also easily makes it possible to provide the exhaust gas cooler as an optional module. In an integrated unit according to the invention, the exhaust gas cooler is frequently made of steel, among other things due to the high temperatures, and the charge air cooler is made of aluminum, among other things for reasons of weight and cost.

In an embodiment, for the purpose of attaching and situating the charge air and exhaust gas lines, the collector boxes of the exhaust gas coolers extend adjacent and parallel to the collector boxes of the charge air cooler, a collector box of the exhaust gas cooler being fixed to a collector box of the charge air cooler.

In an embodiment, a connection of the collector box on the outlet side of the exhaust gas cooler can be connected to the collector box on the outlet side of the charge air cooler. This makes it possible to reduce the physical volume, and the early combination of cooled exhaust gas and cooled charge air produces a good mixing of the gas components.

The integrated unit according to an embodiment the invention can be designed in such a way that the exhaust gas cooler is designed as an exhaust gas cooler. This results in particularly favorable combinations of features. One example thereof is the combination of cooled exhaust gas and cooled charge air in the vicinity of the largely stationary attachment of the exhaust gas cooler, the supporting structure of the exhaust gas cooler being a collector box of the charge air cooler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
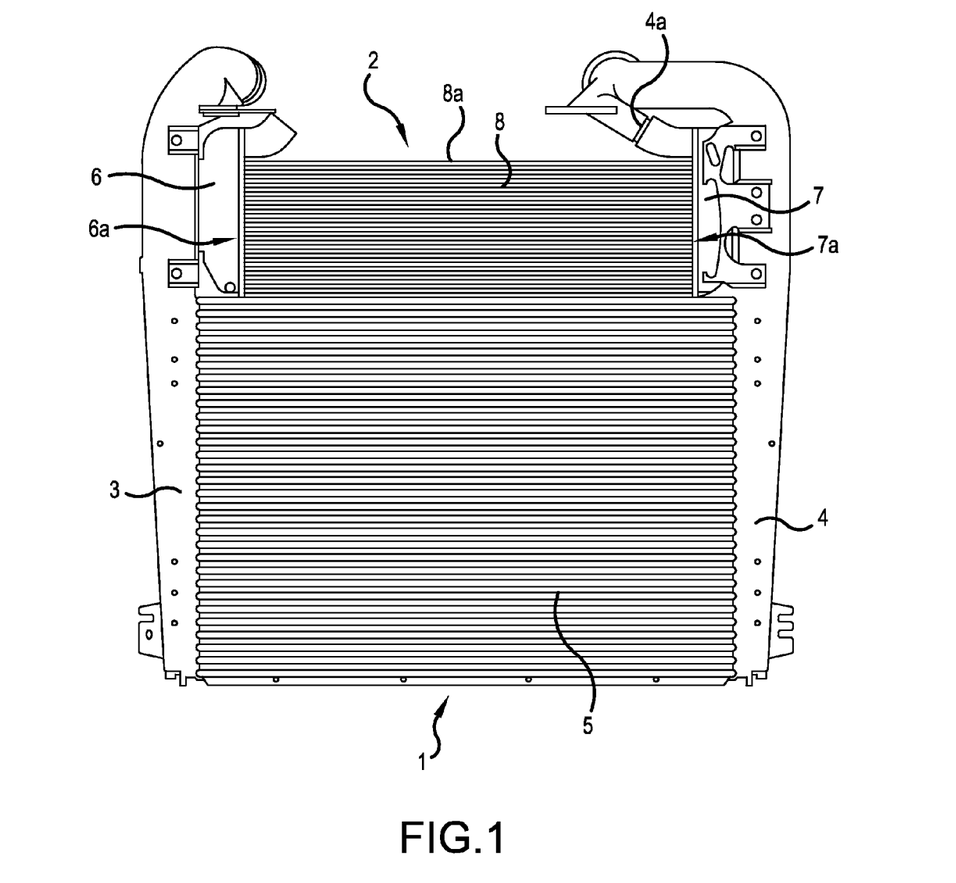
FIG. 1 shows a top view of an integrated unit of a charge air cooler and an exhaust gas cooler according to the invention according to a first exemplary embodiment.

A first exemplary embodiment of the invention is illustrated in FIG. 1, and includes an integrated unit of an air charge cooler 1 and exhaust gas cooler 2. Charge air cooler 1 is made largely of aluminum and includes a collector box 3 on the inlet side and a collector box 4 on the outlet side, which are designed as longitudinal, hollow diecast parts. In their upper end area, the collector boxes have a curved contour adapted to the physical volume for connection to further lines.

Collector boxes 3, 4 are connected by a plurality of parallel flat aluminum tubes 5 situated on a plane, between which rib elements (not illustrated) are provided to enlarge the active surface. Air charge cooler 1 is situated in a front area of a motor vehicle, in the present case a commercial vehicle, in front of an engine coolant radiator, and external air flows around the exchanger tubes in the direction of travel. The longitudinal collector boxes are oriented in a largely perpendicular manner.

Collector boxes 3, 4 extend past the area connected by the exchanger tubes in an upward direction. Exhaust gas cooler 2 is situated in this area between the collector boxes of the charge air cooler. Exhaust gas cooler 2 is made largely of steel and has two side collector boxes 6, 7 which are connected by a plurality of flat exchanger tubes 8 which empty into bases 6a, 7a of collector boxes 6, 7. Parallel exchanger tubes 8 are situated on the same plane as exchanger tubes 5 of charge air cooler 1. Cooling ribs 8a, which are brazed to flat tubes 8 over a wide area, are provided between each of exchanger tubes 8.

Collector box 6 on the inlet side and collector box 7 on the outlet side of exhaust gas cooler are each connected to adjacent collector boxes 3, 4 of charge air cooler, which provide a supporting structure for the exhaust gas cooler, via a supporting member 9, 10 designed as a holding member.

Supporting member 9 on the inlet side is a multi-angled, Z-shaped, sheet metal molded part (see FIG. 2, in particular), which is integrally attached in a welding area 6b of collector box 6 by a tab 9a, for example by laser welding or all-over high-temperature soldering or brazing.

Figure 2:
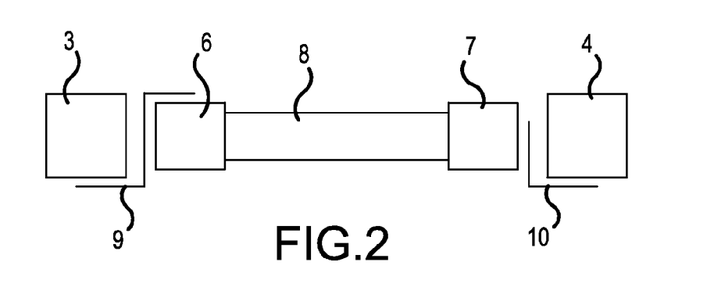
FIG. 2 shows a schematic top view of the exemplary embodiment from FIG. 1, seen from above.

On its opposite end, holding member 9 has tabs 9b which have screw holes for screwing holding member 9 to collector box 3 of the charge air cooler, for which purpose corresponding threads are provided therein.

A gap 9c, which is bridged by holding member 9 and into which the exhaust gas cooler expands upon corresponding heating and material expansion, remains between collector boxes 3, 6 on the inlet side. Z-shaped holding member 9 is elastically deformed so that a secure hold remains, and the original dimensions are achieved again without damage upon cooling.

Figure 4:
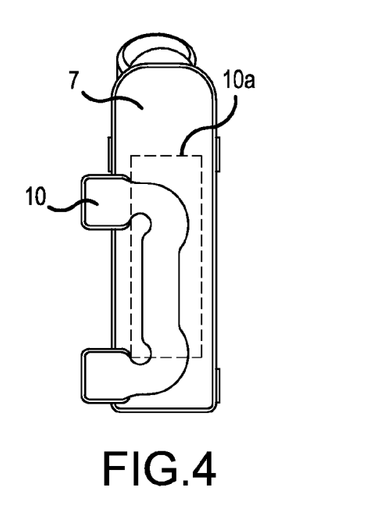
FIG. 4 shows a detail view of the exhaust gas cooler from FIG. 1, having an L-shaped holding member.

On the side of collector boxes 4, 7 on the outlet side, the collector boxes are connected by a holding member 10 having an L-shaped cross-section, the holding member, in turn, being welded to collector 7 of the exhaust gas cooler and screwed to collector 4 of the charge air cooler. The collector box connection via the L-shaped holding member 10 is much more rigid in the main direction of expansion or the direction of the exchanger tubes than the connection via holding member 9, so that an expansion of exhaust gas cooler 2 largely produces only a relative movement of collector boxes 3, 6 on the inlet side toward each other, but does not produce such movement of collector boxes 4, 7 on the outlet side.

This is particularly advantageous in connection with the further arrangement of connections, since collector boxes 4, 7 on the outlet side are connected to each other in a small space via a branching connection 4a of the charge air cooler, in order to combine the exhaust gas and charge air.

This arrangement has the further advantage that situating holding members 9, 10 on surfaces of collector boxes 6, 7 that are perpendicular to each other makes it possible to compensate component tolerances of the exhaust gas cooler in all spatial directions. The Z-shaped holder is attached to the vertical back of collector box 6 of exhaust gas cooler 2 in the direction of travel by means of a mechanical joint, in particular by welding and soldering. Due to its suitable positioning, the component tolerance may be compensated in both the longitudinal tube direction and in the vertical direction. The L-shaped holder is attached laterally to a surface of the other collector box 7 of the exhaust gas cooler, which is perpendicular to the transverse direction or the exchanger tube direction, thereby enabling the component tolerances to be compensated in the vertical direction and in the direction of travel. In the embodiment of the holder according to the described formulation, the connecting pieces of collector boxes 6, 7 may be precisely positioned, and the thermal longitudinal expansion is simultaneously compensated, holder 9, 10 having a sufficient rigidity to tolerate the mechanical stresses that occur and to meet the long-term durability requirements.

A further supporting member in the sense of the invention is designed as side part 11. Side part 11 is situated on the end of the stack of exchanger tubes 8 and cooling ribs 9 and integrally connected over a wide area to each of outer cooling ribs 9, in this case by high-temperature soldering or brazing.

Figure 3:
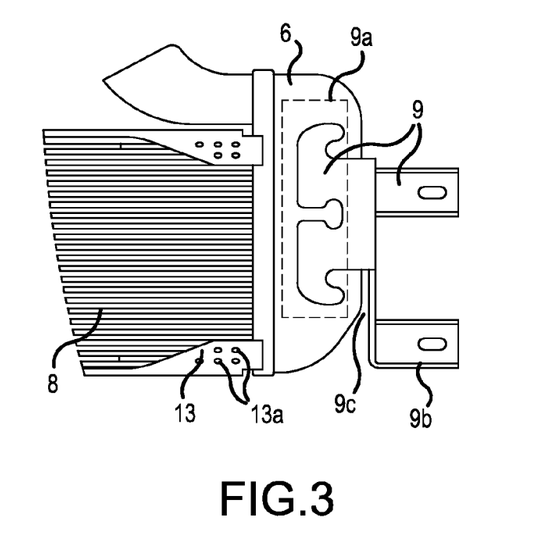
FIG. 3 shows a detail view of the exhaust gas cooler from FIG. 1, having a Z-shaped holding member.
Figure 5:
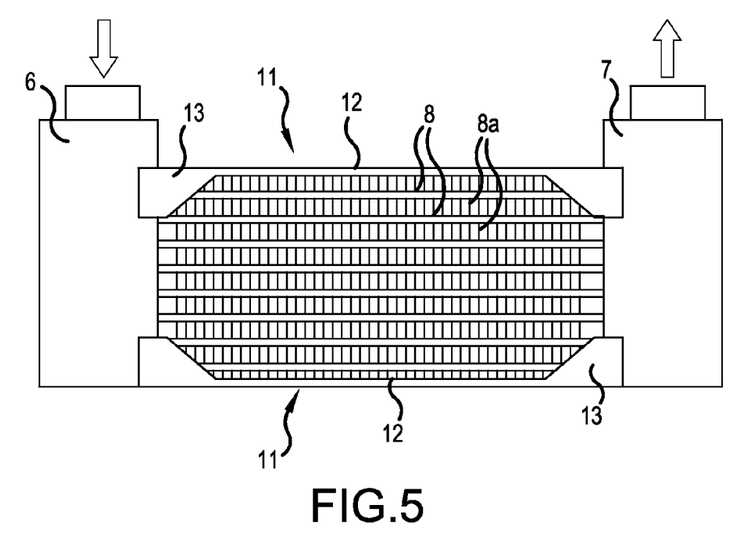
FIG. 5 shows a schematic top view of an exhaust gas cooler according to a further exemplary embodiment of the invention.

In the embodiment shown in FIG. 3 and FIG. 5, side part 11 is designed as a single-piece, sheet metal molded part having folded edges 12, so that it has an essentially U-shaped cross-section. In the end areas, near collector boxes 6, 7, the folded edges increase in size to form latching tabs 13, which extend over a length of collector box 6, 7, in the present case a length of approximately three repeating units of exchanger tubes 8 and cooling ribs 8a, and the folded edges are integrally attached to collector boxes 6, 7 by brazing or welding. Latching tabs 13 have openings 13a, which enable air to flow around the exchanger tubes, even in the area where the exchanger tubes are covered by the latching tabs.

The connection of latching tabs 13 extending in the longitudinal direction of collector boxes 6, 7 achieves a particularly high flexural strength, at least in the end areas of exchanger tubes 8 on the edges, so that any bending load on critical transitions between exchanger tubes 8 and bases 6a, 7a is relieved.

At the same time, it is desirable for the exchanger tubes to be able to expand without hindrance outside this critical area of the transitions in order to avoid excessive material warping at the high temperatures of an exhaust gas cooler. For this purpose, the side part has selective weak points 14 in its central area in preferred, improved embodiments.

Figure 6:
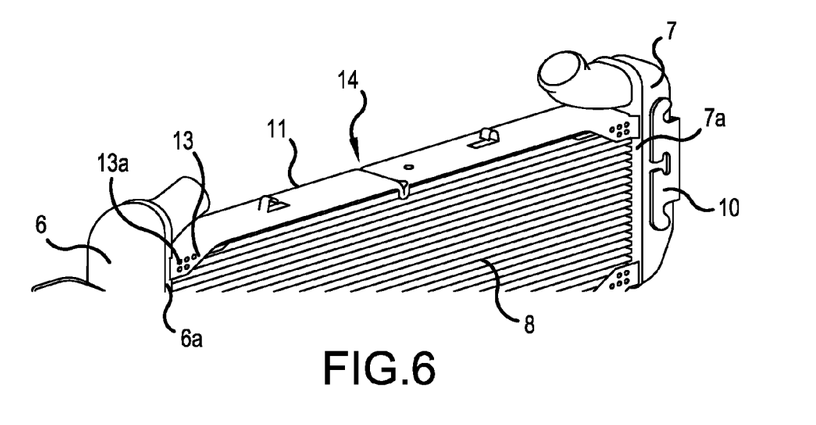
FIG. 6 shows a spatial partial view of the exhaust gas cooler from FIG. 5, having a side part.

In the exemplary embodiment according to FIG. 6, weak point 14 is designed as a transverse slot situated in the middle area, the side part being connected as a single piece in the area of the transverse slot only by a creased flange of the folded edge area.

Figure 7:
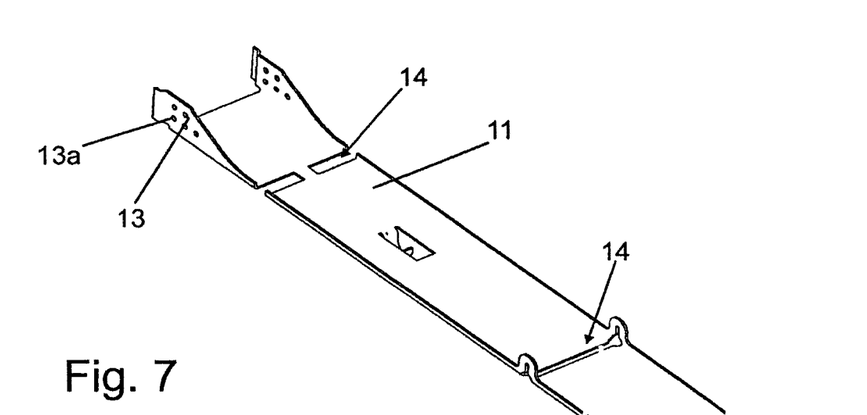
FIG. 7 shows a first modification of the side part from FIG. 6.

In a modification according to FIG. 7, additional weak points in the form of notches having a remaining central strip are provided.

Figure 8:
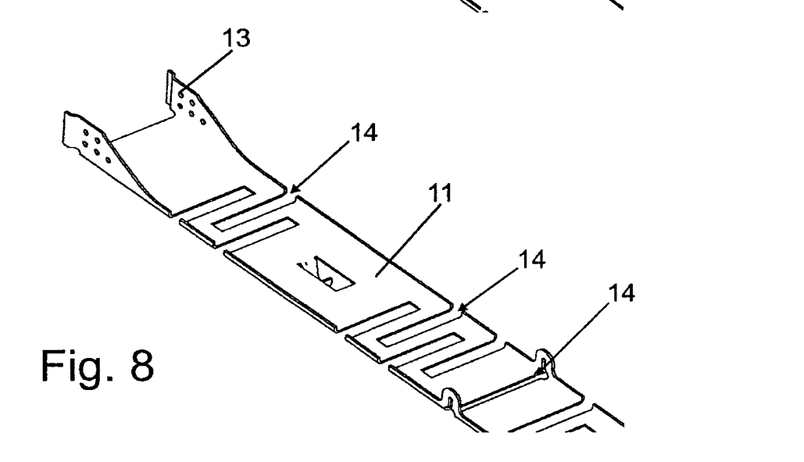
FIG. 8 shows a second modification of the side part from FIG. 6.

In a modification according to FIG. 8, multiple alternating recesses are provided instead of the notches, which also achieves a particularly good expandability of the side part in the longitudinal direction in the area of the weak points.

Figure 10:
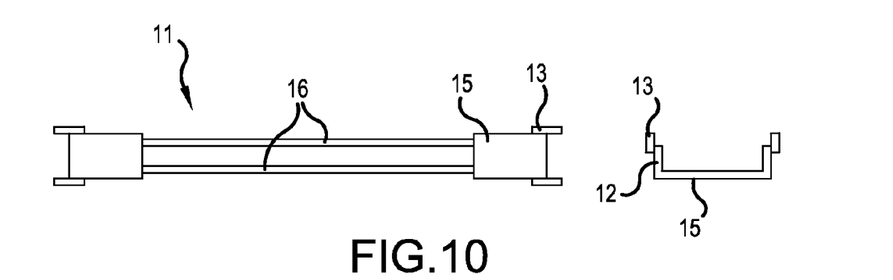
FIG. 10 shows a fourth modification of the side part from FIG. 6.

In a modification according to FIG. 10, only two end areas 15 of the side part 13 are provided with an all-over solid design having a U-shaped cross-section and latching tabs 13, the end areas being connected by narrow connecting strips 16 that are elastic in the longitudinal direction and which also represent a weak point, compared to end areas 15. The length of areas 15 is only approximately 10% to 20% of the total length of the side part.

Figure 9:
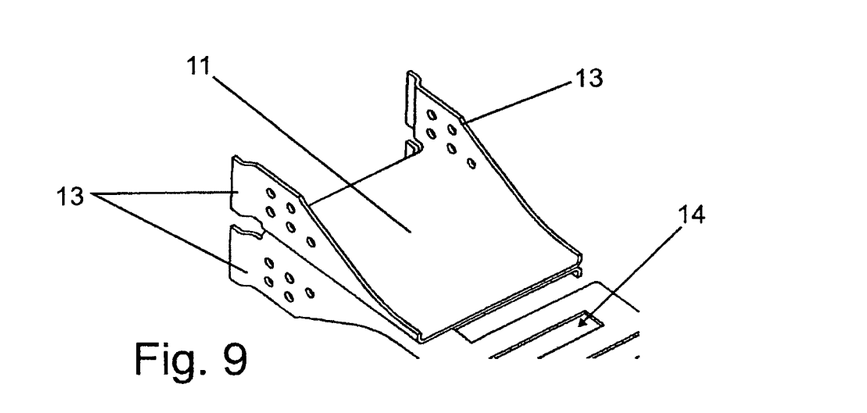
FIG. 9 shows a third modification of the side part from FIG. 6.

End latching tabs 13 may also be doubled, as shown in a modification according to FIG. 9, in particular welded from two metal sheets and designed as a whole having an H-shaped cross-section, which achieves a particularly high degree of stability.

Figure 11:
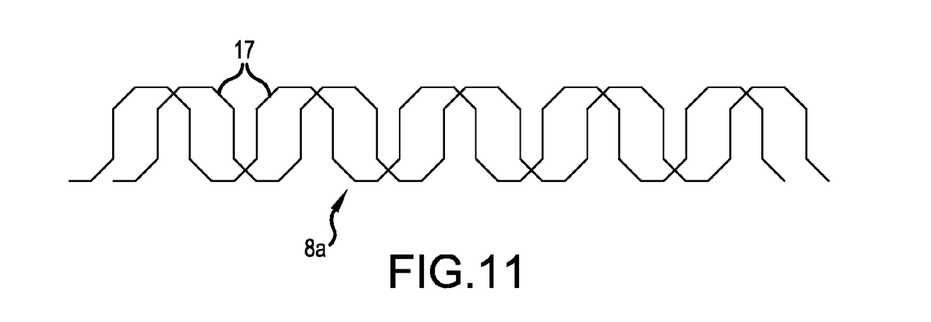
FIG. 11 shows a schematic representation of an improved cooling rib.

FIG. 11 shows a schematic side view of a cooling rib, which makes it possible to further reduce the thermally induced stress. This is achieved by angularities or connections 17 of the rib edges, so that the ribs act as a weaker tension and pressure member in the vertical direction.

A further major cause of the level of thermal stresses in the tube ends is the structural design of the block of cooling ribs and exchanger tubes. According to the prior art, the cooling rib is firmly connected to the tubes over a wide area and thus forms a very rigid component. This is the case, in particular, when using a connecting rib having perpendicular or nearly perpendicular edges. These ribs thus provide a very strong vertical tension and pressure member. In this case, deformation in the horizontal direction or movement of adjacent tubes relative to each other is possible only with great difficulty. According to the prior art, these ribs normally have a great material thickness when made from stainless steel, for reasons of heat conduction. Due to the alternating load, states occur in which the rib-tube block expands to a greater extent in the vertical direction than do the bases or collector boxes and vice versa. As a result, exchanger tubes 8 are subjected to strong alternating bending load in the area where they are attached to the bases. This is true, in particular, near the tube ends, since the cooling ribs are normally located at a distance of 3 to 10 mm from the base, the total length of the exchanger tubes being approximately 70 cm, for example. The bending load on the tube occurs primarily in the space between the end of cooling rib 8*a* and base 6*a*, 7*a*.

In an advantageous embodiment of the rib-tube block the ribs have a shortened design, so that exchanger tubes 8 protrude on both sides by an amount between approximately 10 mm and approximately 25 mm. As a result, the bending load is transferred to a longer piece of tube, and the maximum stress at the end of the tube is reduced.

In a further advantageous embodiment, the material thickness in a stainless steel design is reduced to no more than approximately 0.1 mm, particularly advantageously to approximately 0.8 mm [0.08 mm]. This substantially reduces the rigidity of the rib-tube block and relieves the tube ends, since a portion of the deformations may now also take place in the rib-tube block itself, due to the thermal load.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust gas cooler for a motor vehicle, comprising:
   a first collector box provided on an inlet side;
   a second collector box provided on an outlet side;
   a plurality of exchanger tubes configured to extend between the first collector box and the second collector box, through which exhaust gas flow, the air being configured to flow around the exchanger tubes to cool the exhaust gas; and
   a first supporting member being attached to the first collector box and a second supporting member being attached to the second collector box, wherein a force produced by thermal expansion of the exchanger tubes is introduced into at least one of the first supporting member or the second supporting member,
   wherein the first supporting member and the second supporting member form a first holding member and a second holding member, respectively, configured to each connect the exhaust gas cooler to a supporting structure, and wherein at least one of the first holding member or the second holding member is elastically deformed due to the thermal expansion of the exchanger tubes,
   wherein the second collector box is held substantially stationary on the supporting structure and the first collector box is configured to move relative to the supporting structure as a function of the thermal expansion, and
   wherein the first holding member includes multi-angled and/or Z-shaped sheet metal part.

2. The exhaust gas cooler according to claim 1, wherein the first holding member is integrally connected to the exhaust gas cooler by welding or soldering.

3. The exhaust gas cooler according to claim 1, wherein the first holding member is screwed to the supporting structure.

4. The exhaust gas cooler according to claim 1, wherein the first and second holding members are attached to surfaces that are oriented at an angle to each other and/or at right angles.

5. The exhaust gas cooler according to claim 1, wherein cooling ribs made of steel, are provided between the exchanger tubes.

6. The exhaust gas cooler according to claim 5, wherein the cooling ribs end at a distance of more than approximately 10 mm and up to approximately 25 mm from the collector box.

7. The exhaust gas cooler according to claim 5, wherein the cooling ribs have a material thickness of no more than approximately 0.15 mm.

8. The exhaust gas cooler according to claim 5, wherein the cooling ribs have rounded or angled edges to reduce their rigidity in a vertical direction.

9. The exhaust gas cooler according to claim 5, wherein the cooling ribs have a material thickness of no more than approximately 0.1 mm.

10. The exhaust gas cooler according to claim 5, wherein the cooling ribs have a material thickness of approximately 0.08 mm.

11. An integrated unit of an exhaust gas cooler and a charge air cooler, the integrated unit comprising:
    a first and a second longitudinal collector box of the charge air cooler having a multiplicity of exchanger tubes of the charge air cooler connecting the collector boxes and being provided on a plane through which charge air flows, air being able to flow around the exchanger tubes for cooling the charge air;
    a first and a second collector box of the exhaust gas cooler; and
    a plurality of exchanger tubes extending between the first and second collector boxes of the exhaust gas cooler, through which exhaust gas flows, air being possible to flow around the exchanger tubes of the exhaust gas cooler for cooling the exhaust gas,
    wherein the exchanger tubes of the exhaust gas cooler are provided next to the exchanger tubes of the charge air cooler on the same plane without overlapping, and
    wherein the exhaust gas cooler comprises:
    a first collector box provided on an inlet side;
    a second collector box provided on an outlet side;

a plurality of exchanger tubes configured to extend between the first collector box and the second collector box, through which exhaust gas flow, the air being configured to flow around the exchanger tubes to cool the exhaust gas; and a first supporting member being attached to the first collector box and a second supporting member being attached to the second collector box, wherein a force produced by thermal expansion of the exchanger tubes is introduced into at least one of the first supporting member or the second supporting member, wherein the first supporting member and the second supporting member form a first holding member and a second holding member, respectively, configured to each connect the exhaust gas cooler to a supporting structure, and wherein at least one of the first holding member or the second holding member is elastically deformed due to the thermal expansion of the exchanger tubes, wherein the second collector box is held substantially stationary on the supporting structure and the first collector box is configured to move relative to the supporting structure as a function of the thermal expansion, and wherein the first holding member includes a multi-angled and/or Z-shaped sheet metal part.

12. The integrated unit according to claim 11, wherein the first and second collector boxes of the charge air cooler have an area that is not penetrated by exchanger tubes of the charge air cooler in their longitudinal direction, and wherein the exhaust gas cooler is accommodated between the collector boxes of the charge air cooler in this area.

13. The integrated unit according to claim 12, wherein the first and second collector boxes of the exhaust gas cooler extend adjacent and parallel to the first and second collector boxes of the charge air cooler, and wherein the first collector box of the exhaust gas cooler is attachable to the first collector box of the charge air cooler.

14. The integrated unit according to claim 11, wherein a connection of the second collector box on an outlet side of the exhaust gas cooler is connected to the second collector box on the outlet side of the charge air cooler.

15. An exhaust gas cooler for a motor vehicle, comprising:
a first collector box provided on an inlet side;
a second collector box provided on an outlet side;
a plurality of exchanger tubes configured to extend between the first collector box and the second collector box, through which exhaust gas flow, the air being configured to flow around the exchanger tubes to cool the exhaust gas; and
a first supporting member being attached to the first collector box and a Second supporting member being attached to the second collector box wherein a force produced by thermal expansion of the exchanger tubes is introduced into at least one of the first supporting member or the second supporting member,
wherein the first supporting member and the second supporting member, form a first holding member and a second holding member, respectively, configured to each connect the exhaust gas cooler to a supporting structure, and wherein at least one of the first holding member or the second holding member is elastically deformed due to the thermal expansion of the exchanger tubes,
wherein the second collector box is held substantially stationary on the supporting structure and the first collector box is configured to move relative to the supporting structure as a function of the thermal expansion, and
wherein the first holding member includes a Z-shaped sheet metal part and the second holding member includes an L-shaped sheet metal part.

* * * * *